United States Patent
Hong

(10) Patent No.: US 9,961,178 B2
(45) Date of Patent: May 1, 2018

(54) EMBEDDED ACTIVE MATRIX ORGANIC LIGHT EMITTING DIODE (AMOLED) FINGERPRINT SENSOR

(71) Applicant: Motorola Mobility LLC, Chicago, IL (US)

(72) Inventor: Seongchul Daniel Hong, Vernon Hills, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days. days.

(21) Appl. No.: 15/079,724

(22) Filed: Mar. 24, 2016

(65) Prior Publication Data

US 2017/0279948 A1    Sep. 28, 2017

(51) Int. Cl.
*G06K 9/00*     (2006.01)
*H04M 1/673*    (2006.01)
(Continued)

(52) U.S. Cl.
CPC .......... *H04M 1/673* (2013.01); *G06F 3/0412* (2013.01); *G06F 3/0421* (2013.01); *G06F 21/32* (2013.01);
(Continued)

(58) Field of Classification Search
CPC .............. B32B 2457/208; G04G 21/00; G06F 2203/04106; G06F 2203/04108; G06F 3/041; G06F 3/0482; G06F 3/04842; G06F 3/04845; G06F 3/044; G06F 3/03547; G06F 21/32; G06F 2203/0338; G06F 3/0414; G06F 3/0436; G06F 3/0412; G06F 3/042; G06F 3/0488; G06F 21/34; H01L 27/323; H01L 27/3262; H01L 27/1214; H01L 27/20; H01L 41/1132; H01L 2251/5323; H01L 41/311; Y10T 156/10;
(Continued)

(56) References Cited

U.S. PATENT DOCUMENTS

| 6,941,002 B1* | 9/2005 | Kawahara ............ G06K 9/0004 382/124 |
| 9,024,910 B2* | 5/2015 | Stephanou ............ G06F 3/0414 345/173 |

(Continued)

FOREIGN PATENT DOCUMENTS

| EP | 2631898 | 8/2013 |
| JP | H1090551 | 4/1998 |

(Continued)

OTHER PUBLICATIONS

"Extended European Search Report", EP Application No. 17161499.3, Jul. 21, 2017, 8 pages.

(Continued)

*Primary Examiner* — Aklilu Woldemariam

(57) ABSTRACT

Various embodiments provide a handheld computing device, such as a cellular phone, that includes a fingerprint sensor embedded in the device's display active area. The fingerprint sensor is composed of a series of PIN diodes that are configured to operate in a photo-receiving mode. In various embodiments, the PIN diodes are formed as active matrix organic light emitting diodes (AMOLEDs) at least partially within the gap between pixels in the display active area.

20 Claims, 10 Drawing Sheets

(51) Int. Cl.
| | | |
|---|---|---|
| *H01L 27/32* | (2006.01) | |
| *G06F 3/041* | (2006.01) | |
| *G06F 3/042* | (2006.01) | |
| *G06F 21/32* | (2013.01) | |
| *G06K 9/22* | (2006.01) | |
| *H01L 27/12* | (2006.01) | |

(52) U.S. Cl.
CPC ....... *G06K 9/0004* (2013.01); *G06K 9/00013* (2013.01); *G06K 9/00087* (2013.01); *G06K 9/22* (2013.01); *H01L 27/323* (2013.01); *G06K 9/00* (2013.01); *H01L 27/1222* (2013.01); *H04M 2201/02* (2013.01); *H04M 2201/04* (2013.01)

(58) Field of Classification Search
CPC ...... G02F 1/13338; G02F 2001/13312; G09G 3/3208; B06B 1/0207; B06B 1/0607; G01S 7/52028; G01S 15/89; G01S 15/8906; G01S 7/52; G01S 15/8956; G01S 7/521; G06K 9/0004; G06K 9/0002; G06K 9/00013; G06K 9/00087; G06K 9/00093; G06K 9/001; G06K 9/00906; G06K 9/12; G06K 9/00; G06K 9/00067; G06K 9/00885; G06K 9/6255; G06T 2207/10132; G06T 7/344; G06T 7/44; G07C 9/00087
USPC .............. 382/124, 115, 116, 125, 127, 321; 345/173, 174, 501
See application file for complete search history.

(56) References Cited

U.S. PATENT DOCUMENTS

| | | | | |
|---|---|---|---|---|
| 2004/0252867 | A1* | 12/2004 | Lan | G06K 9/0004 382/124 |
| 2005/0063572 | A1* | 3/2005 | Setlak | G06K 9/00013 382/124 |
| 2005/0200291 | A1 | 9/2005 | Naugler | |
| 2007/0241998 | A1 | 10/2007 | Fish et al. | |
| 2008/0121442 | A1* | 5/2008 | Boer | G06F 3/0412 178/18.09 |
| 2008/0122792 | A1 | 5/2008 | Izadi et al. | |
| 2008/0123908 | A1* | 5/2008 | Waldman | G06K 9/00046 382/124 |
| 2010/0220900 | A1* | 9/2010 | Orsley | G06F 3/0421 382/124 |
| 2012/0092302 | A1 | 4/2012 | Imai et al. | |
| 2012/0092350 | A1* | 4/2012 | Ganapathi | G02B 26/0833 345/501 |
| 2012/0258773 | A1* | 10/2012 | Alvarez Rivera | G06F 1/1656 455/556.1 |
| 2012/0321149 | A1* | 12/2012 | Carver | G06K 9/0004 382/124 |
| 2013/0135328 | A1* | 5/2013 | Rappoport | G06F 3/0481 345/522 |
| 2013/0231046 | A1* | 9/2013 | Pope | G06K 9/00013 455/41.1 |
| 2014/0036168 | A1* | 2/2014 | Ludwig | G06F 3/0412 349/12 |
| 2014/0111560 | A1 | 4/2014 | Yamakawa | |
| 2014/0240370 | A1 | 8/2014 | Sakairi et al. | |
| 2014/0340363 | A1 | 11/2014 | Ikeda et al. | |
| 2015/0015515 | A1* | 1/2015 | Dickinson | G06F 3/043 345/173 |
| 2015/0123931 | A1* | 5/2015 | Kitchens | G06F 3/0414 345/174 |
| 2015/0177884 | A1* | 6/2015 | Han | G06F 3/044 345/174 |
| 2015/0331508 | A1* | 11/2015 | Nho | G06F 3/0421 345/173 |
| 2016/0063300 | A1* | 3/2016 | Du | G06K 9/00033 382/124 |
| 2016/0070967 | A1* | 3/2016 | Du | G06K 9/00093 382/124 |
| 2016/0071371 | A1* | 3/2016 | Pececnik | G07F 17/3244 463/25 |
| 2016/0299629 | A1* | 10/2016 | Doyle | G06F 3/0418 |
| 2017/0289805 | A1 | 10/2017 | Hong | |

FOREIGN PATENT DOCUMENTS

| | | |
|---|---|---|
| JP | 2005037930 | 2/2005 |
| JP | 2008504576 | 2/2008 |
| JP | 2008071835 | 3/2008 |
| JP | 2008529071 | 7/2008 |
| JP | 2009283676 | 12/2009 |
| JP | 2015005280 | 1/2015 |
| JP | 2016035768 | 3/2016 |
| KR | 20100069591 | 6/2010 |
| KR | 20110101683 | 9/2011 |
| KR | 20160029698 | 3/2016 |

OTHER PUBLICATIONS

"Extended European Search Report", EP Application No. 17161555.2, May 9, 2017, 8 pages.

"Foreign Office Action", KR Application No. 10-2017-0035407, Oct. 1, 2017, 17 pages.

"Non-Final Office Action", U.S. Appl. No. 15/085,270, Sep. 15, 2017, 19 pages.

Kim, "48.3: A 2 Inch LTPS AMOLED with an Embedded Lateral p-i-n. Photodiode Sensors", 2008 SID International Symposium, Society for Information Display, May 18, 2008, 4 pages.

"Foreign Office Action", KR Application No. 10-2017-0040094, Oct. 1, 2017, 18 pages.

"Foreign Office Action", JP Application No. 2017-056845, Feb. 20, 2018, 9 pages.

\* cited by examiner

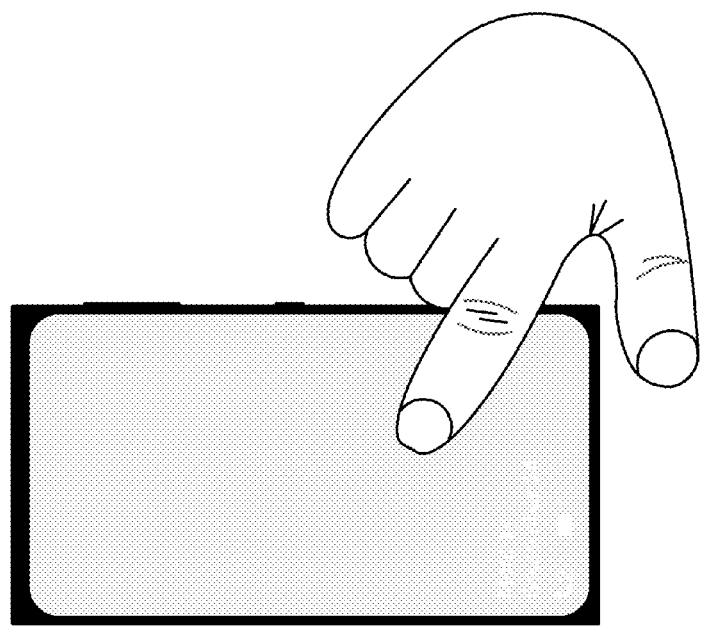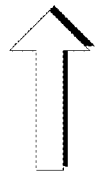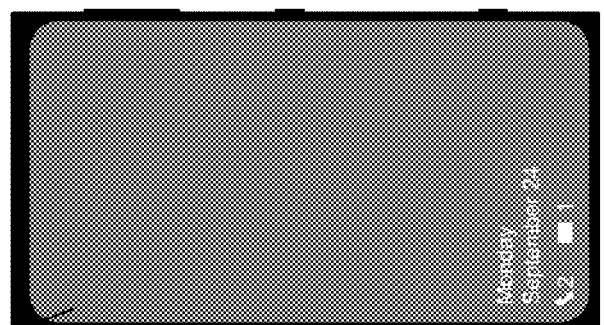
FIG. 7

EMBEDDED ACTIVE MATRIX ORGANIC LIGHT EMITTING DIODE (AMOLED) FINGERPRINT SENSOR

BACKGROUND

Many devices include a fingerprint sensor to provide a degree of security for the device. Specifically, a device such as a cellular phone or other portable device can include a fingerprint sensor to enable the user to lock the device and then subsequently unlock the device by having their fingerprint scanned by the fingerprint sensor. If the fingerprint matches the fingerprint profile stored on the device, the device will be unlocked. If, on the other hand, the fingerprint does not match the fingerprint profile stored on the device, the device cannot be unlocked.

Typically, fingerprint sensors are located somewhere on the housing of the device. For example, many cellular phones include a fingerprint sensor located on what can be considered as the bezel of the device, outside the display active area. Doing so consumes device real estate and can reduce the display size.

BRIEF DESCRIPTION OF THE DRAWINGS

Embodiments of embedded active matrix organic light emitting diode (AMOLED) fingerprint sensors in a display active area are described with reference to the following FIGS. The same numbers may be used throughout to reference like features or components that are shown in the FIGS.:

FIG. 7 illustrates an example computing device in accordance with one or more embodiments.

DETAILED DESCRIPTION

Overview

Various embodiments provide a handheld computing device, such as a cellular phone, that includes a fingerprint sensor embedded in the device's display active area. The fingerprint sensor is composed of a series of PIN diodes that are configured to operate in a photo-receiving mode. In various embodiments, the PIN diodes are formed as active matrix organic light emitting diodes (AMOLEDs) at least partially within the gap between pixels in the display active area. The density of PIN diodes can vary, such as by being formed adjacent every pixel, every two pixels, every four pixels, and the like. The PIN diodes serving as the fingerprint sensor can be connected with a touch sensor, force touch sensor, or any other suitable sensor that detects a finger, to cause pixels located adjacent a touched area to light up the touched area to increase light input to the PIN diodes. Doing so enables a fingerprint to be detected by the device, as described below in more detail.

Integrating the fingerprint sensor into the display active area can reduce the cost to produce a handheld computing device and can enable the display active area to be increased in size. Moreover, no additional fingerprint sensor flex is needed and the sensing integrated circuit can be mounted on the display flex. Moreover, flexibility is enhanced by virtue of incorporating the fingerprint sensor PIN diodes within most if not all of the display active area. In this manner, any area on the display active area that is touched by a user can serve as a fingerprint sensor. This increases the freedom in device design and cellular phone design. Further, using AMOLEDs to implement the PIN diodes results in very small power consumption because, in some embodiments, only areas that are touched are illuminated. Further, devices or phones that incorporate fingerprint sensors as described in this document can serve as convenient scanners since the whole display active area can serve as a photo sensor. Moreover, the diode layer can also serve as an ambient light sensor.

Before describing the various embodiments, the following discussion is provided to facilitate the reader's understanding of organic light emitting diodes (OLEDs) and in particular, active matrix organic light emitting diodes (AMOLEDs).

Organic Light Emitting Diodes

An OLED can operate in both a light-producing mode and a light sensing-mode.

In the light-producing mode, an OLED converts electrical energy into light by way of electroluminescence. In this mode, the OLED is forward biased with an external voltage causing electrons and holes to be injected into an organic (carbon-based) material of the OLED. The electrons and holes combine in the organic material into an electron-hole pair and, in the process, emit a photon of light.

Figure 1:
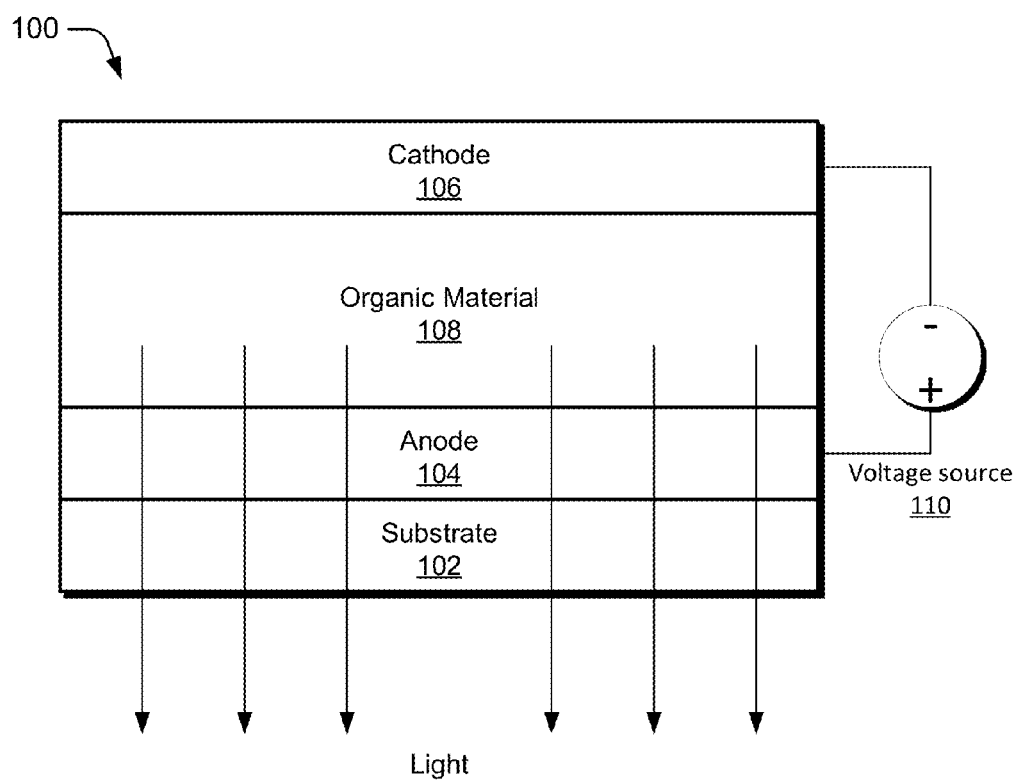
FIG. 1 illustrates an organic light emitting diode (OLED).

FIG. 1 shows an example OLED generally at 100. The OLED is formed on a substrate 102, such as glass and includes an anode 104, a cathode 106, and two or more layers of organic material 108. When a voltage from a voltage source 110 is applied with sufficient potential, OLED 100 becomes forward biased and a current flows from cathode 106 to anode 104. Cathode 106 provides electrons to organic material 108, and anode 104 removes electrons from organic material 108 or, equivalently, provides holes to organic material 108. The electrons and holes combine in organic material 108 and emit photons of light by way of electroluminescence.

In general, as the current flowing from cathode 106 to anode 104 is increased, more electrons and holes are injected into organic material 108 and more photons of light are emitted thereby increasing the brightness or luminance of OLED 100. The color of the light emitted by OLED 100 depends on the type of organic molecules in organic material 108.

An array of OLEDs, such as OLED 100, can be deposited and patterned on a substrate to form a display. The brightness or luminance of each OLED in the array can be individually controlled to form an image viewable on the display. Today, OLED display technology is used in a wide range of electronic devices and appliances, from small handheld mobile phones to large-panel televisions. The power consumption associated with OLED displays, although often superior to liquid crystal displays, can be relatively high because they are often driven with sufficient power to provide enough light output to compete with the strongest ambient light environments that they may be operated within, such as outdoor environments where sunlight can be strong.

As noted above, the brightness or luminance of an OLED, while forward biased, can be controlled through regulation of the current that passes through it. Therefore, pixel circuits are used in OLED displays to control the current flow through the OLEDs making up the displays so that an image can be formatted. For example, in an active matrix OLED (AMOLED) display, the pixel circuits can include at least two thin film transistors (TFTs) and a storage capacitor to control the current flow through an OLED.

Figure 2:
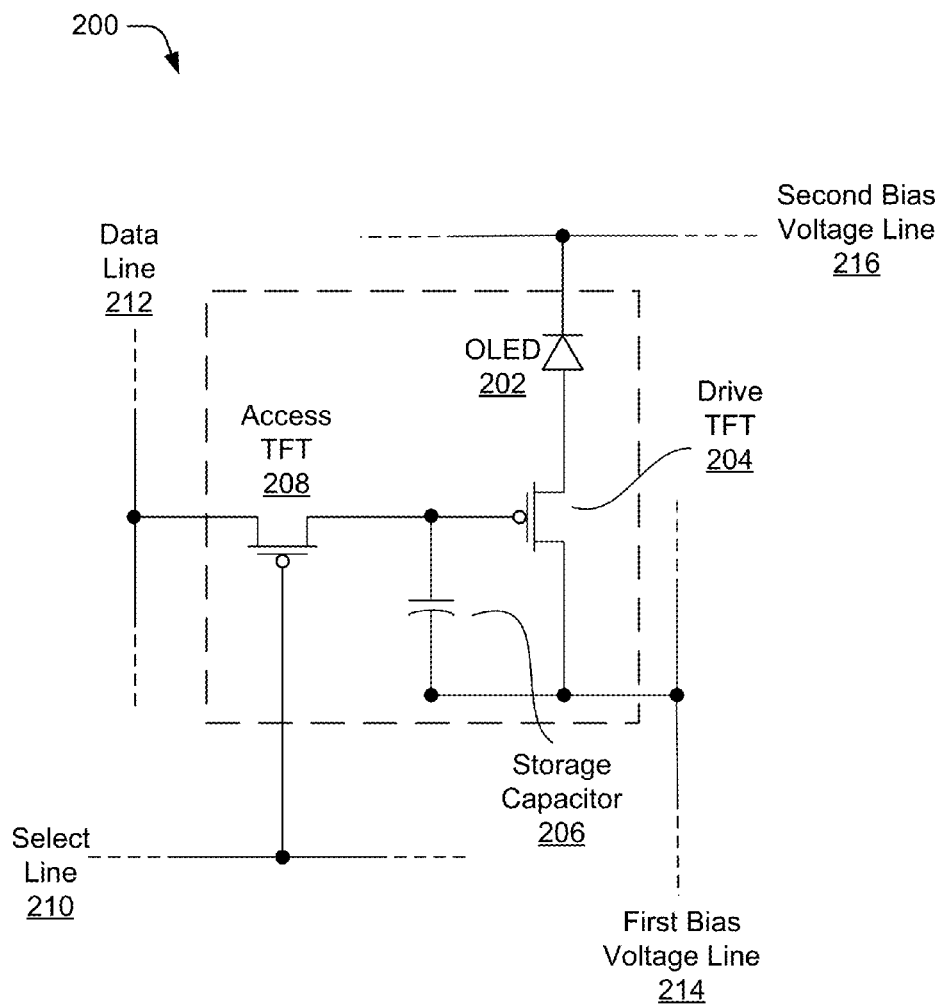
FIG. 2 illustrates an example pixel circuit for an AMOLED display.

FIG. 2 illustrates one example of such a pixel circuit 200 for an AMOLED display that includes an OLED 202, a drive thin film transistor (TFT) 204, a storage capacitor 206, and an access TFT 208.

In operation, a controller (not shown) selects pixel circuit 200 in an array of pixel circuits using select line 210 and programs the brightness or luminance of OLED 202 using data line 212. More specifically, the controller places an appropriate voltage on select line 210 to turn on access TFT 208 and, once access TFT 208 is on, the controller places an appropriate voltage on data line 212 to program a voltage on the gate of drive TFT 204 such that OLED 202 provides a desired brightness or luminance.

Storage capacitor 206 is used to prevent discharge (due to leakage through access TFT 208) of the voltage programmed on the gate of drive TFT 204. By preventing discharge of the voltage programmed on the gate of drive TFT 204, storage capacitor 206 allows continuous driving of OLED 202 by drive TFT 204 at the desired brightness or luminance while other pixels in the display are selected and programmed. Drive TFT 204 drives OLED 204 using power supplied by a positive voltage source coupled across first bias voltage line 214 and second bias voltage line 216. The positive voltage source also forward biases OLED 202.

Drive TFT 204 is biased in saturation (i.e., $|V_d|>|V_{gs}-V_t|$) during normal operation of pixel circuit 200 such that it behaves as a constant current source controlled by the voltage programmed on its gate. Thus, changing the voltage programmed on the gate of drive TFT 204 changes the current through OLED 202 and, thereby, controls its brightness or luminance in a predictable manner. The brightness or luminance of each OLED in an array of pixels can be individually programmed using the configuration of pixel circuit 200 to format an image for display.

Pixel circuit 200 can also be operated in a light-sensing mode the principle of which can be utilized with the inventive fingerprint sensor described below.

To perform in the light sensing mode, OLED 202 in pixel circuit 200 is placed into a photovoltaic and/or photoconductive mode. In the photovoltaic mode, OLED 202 is unbiased, while in the photoconductive mode an external reverse bias is applied across OLED 202. When OLED 202 is not biased (in the photovoltaic mode) or under reverse bias (in the photoconductive mode), OLED 202 operates as a photodiode that is capable of converting light that strikes its surface into current.

The controller (not shown) is configured to place OLED 202 in a photovoltaic and/or photoconductive mode by controlling the voltage applied across first bias voltage line 214 and second bias voltage line 216. More specifically, the controller can alternately switch the voltage applied across first bias voltage line 214 and second bias voltage line 216 from a positive voltage (sufficient to forward bias OLED 202) while operating in the display mode, to be either zero or a negative voltage (sufficient to reverse bias OLED 202) while operating in the sense mode.

When pixel circuit 200 is to operate in the light-sensing mode, the controller is further configured to bias drive TFT 204 in its linear region (i.e., $|V_d|<|V_{gs}-V_t|$), as opposed to its saturation region when pixel circuit 200 is functioning in the display mode. The controller can do this by programming an appropriate voltage on the gate of drive TFT 204.

It should be noted that pixel circuit 200 provides only one example of a pixel circuit for an AMOLED display. Other pixel circuits can be further used in embodiments of the present disclosure. For example, other pixel circuits with additional circuitry (e.g., for compensating non-uniformities and stability issues associated with TFTs), different TFT types (e.g., n-type rather than p-type), and/or different programming methods (e.g., current-programming rather than voltage-programming) can be used.

Having considered some operational characteristics of organic light emitting diodes, consider now a discussion of a fingerprint sensor in accordance with one or more embodiments.

Example Fingerprint Sensor Layouts

Figure 3:
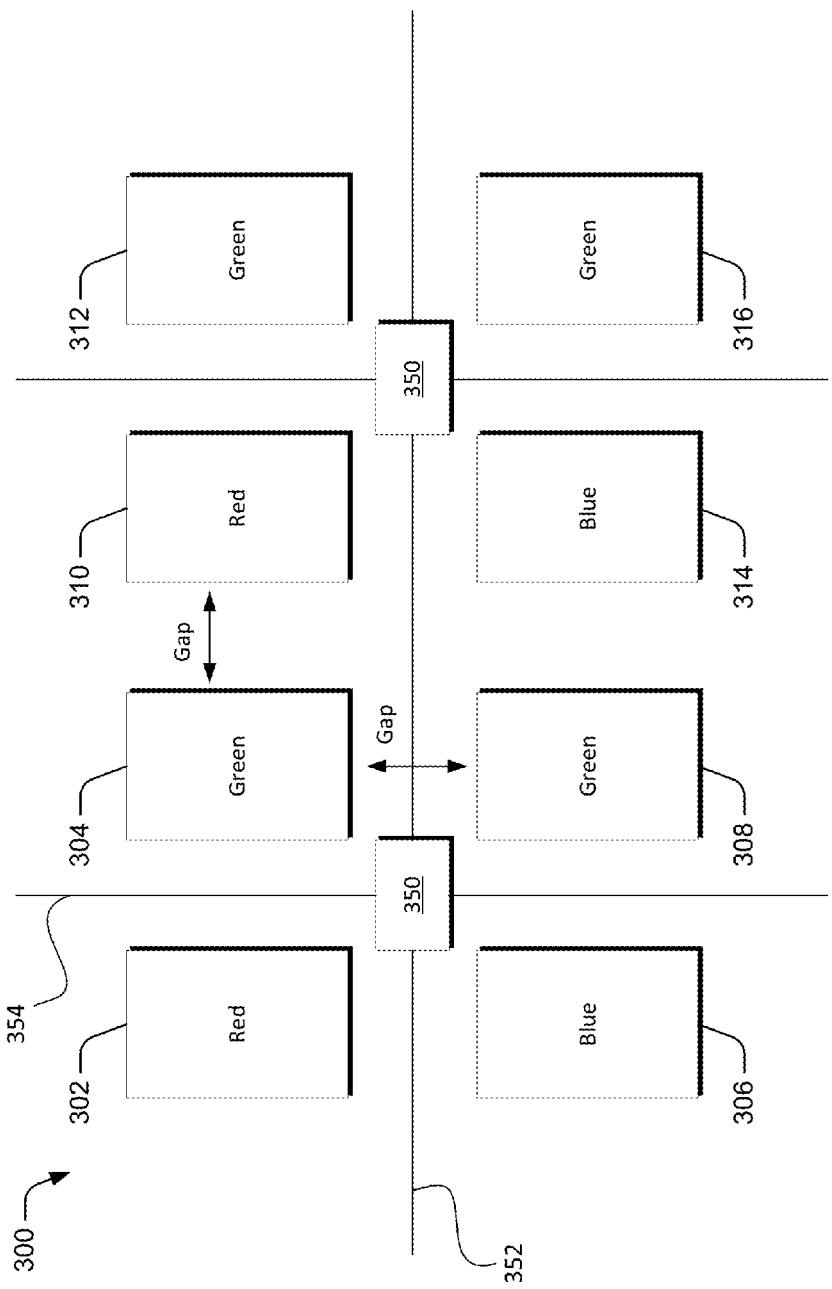
FIG. 3 illustrates an AMOLED display with embedded fingerprint sensors in accordance with one embodiment.

FIG. 3 illustrates aspects of an example fingerprint sensor in accordance with one or more embodiments generally at 300. In this example, the fingerprint sensor includes an array of pixels consisting of four-pixel cells. A first four-pixel cell includes pixels 302, 304, 306, and 308. A second four-pixel cell includes pixels 310, 312, 314, and 316. In this example, pixel 302 is a red pixel, pixel 304 is a green pixel, pixel 306 is a blue pixel, pixel 308 is a green pixel, and so on. Each individual pixel has a corresponding pixel circuit such as pixel circuit 200 (FIG. 2). When the pixel circuits are fabricated, a gap is left between each pixel. Gap size can vary based on resolution, but gap widths typically range from between 20-50 microns. So, for example, a first gap is shown between pixels 304, 310 and a second gap is shown between pixels 304, 308. Lines 352, 354 constitute a control line, and a detect line respectively that are utilized to control a switching transistor and detect and accumulated charge on a capacitor, as will be described below in more detail.

In the illustrated and described embodiment, the fingerprint sensor also includes a plurality of PIN diode circuits 350 formed at least partially within the gap between pixels. In this particular example, one PIN diode circuit is formed for each four-pixel cell. It is to be appreciated and understood, however, that other densities can be employed without departing from the spirit and scope of the claimed subject matter. In this particular example, PIN diode circuits 350 lie entirely within the gap between the pixels. Other configurations are, however, possible. As an example, consider FIG. 4.

Figure 4:
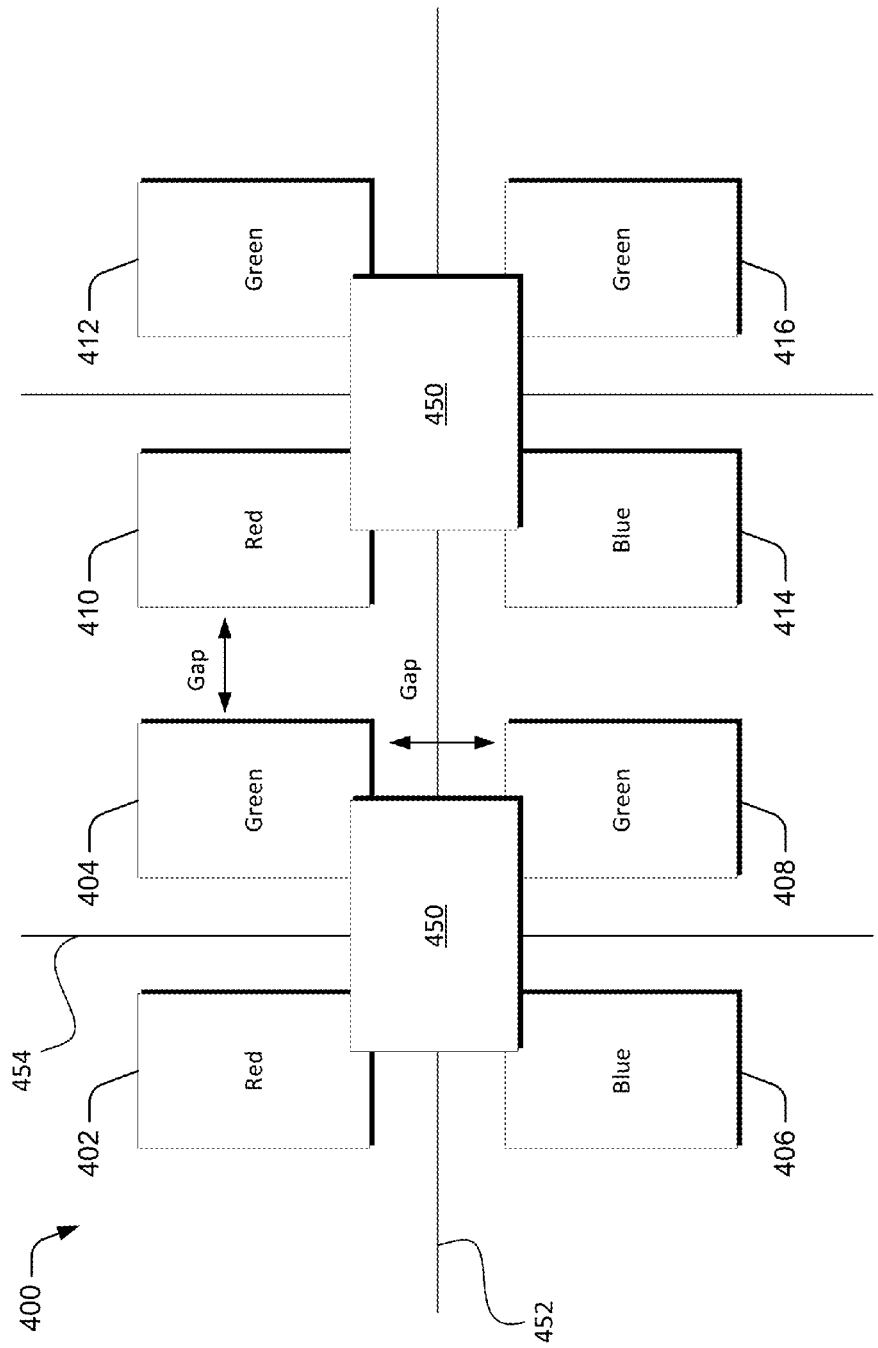
FIG. 4 illustrates an AMOLED display with embedded fingerprint sensors in accordance with one embodiment.

FIG. 4 illustrates aspects of an example fingerprint sensor in accordance with one or more other embodiments generally at 400. In this example, the fingerprint sensor includes an array of pixels consisting of four-pixel cells. A first four-pixel cell includes pixels 402, 404, 406, and 408. A second four-pixel cell includes pixels 410, 412, 414, and 416. In this example, pixel 402 is a red pixel, pixel 404 is a green pixel, pixel 406 is a blue pixel, pixel 408 is a green pixel, and so on. Each individual pixel has a corresponding pixel circuit such as pixel circuit 200 (FIG. 2). When the pixel circuits are fabricated, a gap is left between each pixel. So, for example, a first gap is shown between pixels 404, 410 and a second gap is shown between pixels 404, 408.

In the illustrated and described embodiment, the fingerprint sensor also includes PIN diode circuits 450 formed at least partially within the gap between pixels. Here, however, unlike the FIG. 3 embodiment in which the PIN diode circuit is formed entirely within the gap, there is an area of overlap between each PIN diode circuit and an adjacent pixel. In this particular example, one PIN diode circuit is formed for each four-pixel cell. It is to be appreciated and understood, however, that other densities can be employed without departing from the spirit and scope of the claimed subject matter. Lines 452, 454 constitute a control line, and a detect line respectively that are utilized to control a switching transistor and detect an accumulated charge on a capacitor as will be described below in more detail.

Having considered example fingerprint sensor layouts in accordance with one or more embodiments, consider now an example PIN diode circuit in accordance with one or more embodiments.

Example PIN Diode Circuit

Figure 5:
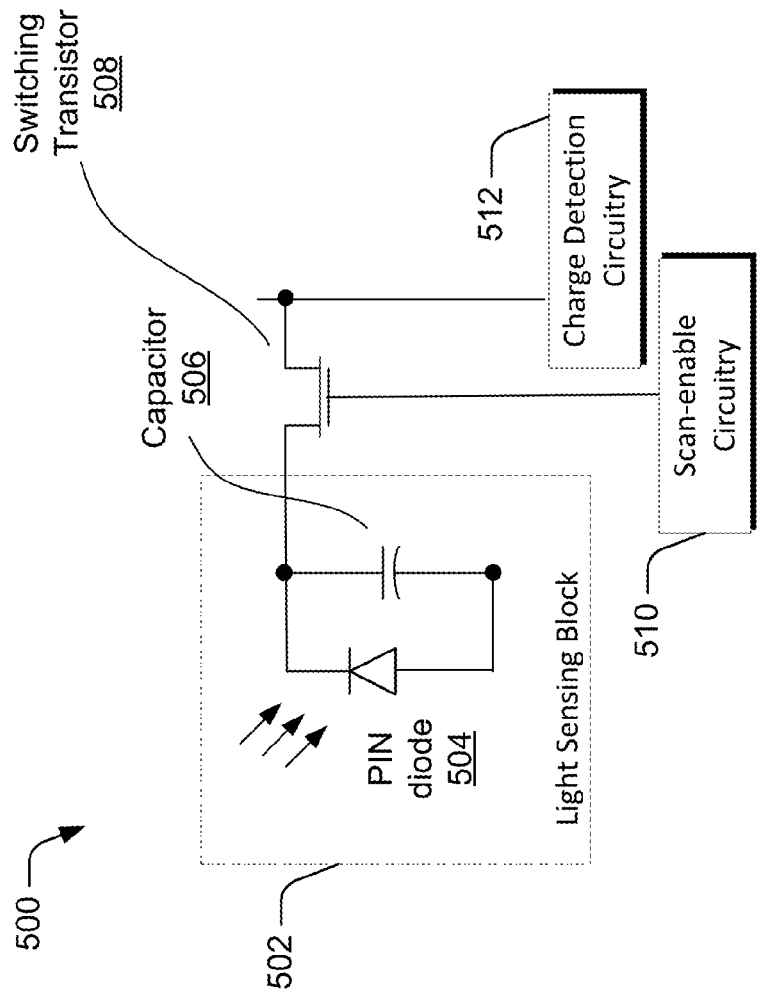
FIG. 5 illustrates an example PIN diode circuit in accordance with one or more embodiments.

FIG. 5 illustrates an example PIN diode circuit in accordance with one or more embodiments, generally at 500. In this example, PIN diode circuit includes a light sensing block 502 comprising a PIN diode 504 and a capacitor 506 connected across the PIN diode 504. In the illustrated and described embodiment, the PIN diode 504 is implemented as an organic light emitting diode (OLED) and more specifically, an active matrix organic light emitting diode (AMOLED). A switching transistor 508 is connected to the light sensing block 502. The switching transistor 508 has its gate connected to scan-enable circuitry 510. Charge detection circuitry 512 is connected to the source of switching transistor 508, which can be either a p- or n-type transistor.

In operation, light sensing block 502 is configured to sense incoming light in a manner described above. When the switching transistor 508 is turned off, light that is received by PIN diode 504 can be used to charge capacitor 506. In order to read the charge on the capacitor, scan-enable circuitry 510 turns on switching transistor 508 thus allowing charge detection circuitry 512 to detect the charge that has accumulated in the capacitor.

In some embodiments, the PIN diode circuit can be formed without increasing the mask count used to form pixel circuit 200 (FIG. 2). The mask count can range from between 5-8 masks depending on the architecture. Mask count economies are achieved because the PIN diode circuit includes a vertical PIN structure whose material will be deposited to form the OLED of each pixel circuit.

Having considered an example PIN diode circuit, consider now one optimization that can be utilized in forming the PIN diode circuit.

Example PIN Diode Optimization

Typically, when forming AMOLED displays, low temperature polycrystalline silicon (LTPS) is employed due to its higher electron and hole mobility. LTPS is formed by first depositing an amorphous silicon layer on a substrate, such as glass. The amorphous silicon layer is then re-crystallized to polycrystalline silicon by exposing the amorphous silicon layer to a laser, such as during an excimer laser annealing (ELA) process. However, due to a high concentration of dangling bonds, amorphous silicon possesses native light sensitivity which facilitates formation of light sensors.

Figure 6:
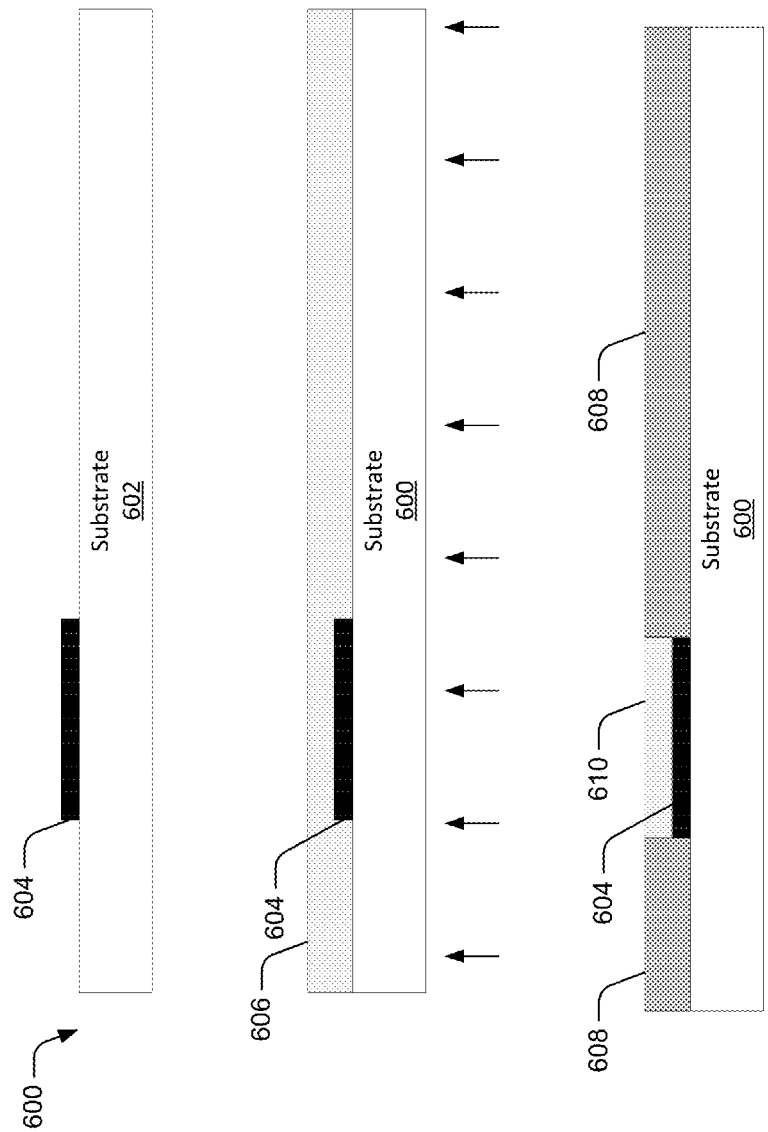
FIG. 6 illustrates a substrate and sensor formation process in accordance with one or more embodiments.

FIG. 6 illustrates a process, generally at 600, in which an improved AMOLED is formed.

A substrate 602 is provided and can include any suitable type of material such as glass, polyimide, and the like. A layer of blocking material 604 is formed over the substrate and can comprise any suitable type of laser absorbing or laser reflecting material. In some instances, blocking material 604 can comprise a metal material, such as molybdenum, aluminum, and the like. Typically, the blocking material can be formed over the substrate and subsequently patterned and etched to leave behind an island of blocking material. Next, a layer of amorphous silicon 606 is formed over the substrate 600. The substrate is next exposed to a laser annealing process, indicated by the arrows on the underside of the substrate 600, which recrystallized the amorphous silicon 606 into a layer of polycrystalline silicon 608. Notice that blocking material 604 prevented an overlying layer of amorphous silicon 610 from being recrystallized in the polysilicon. The layer of amorphous silicon 610 can now serve as a light sensor in the PIN diode circuit.

Having considered an example process in which an improved AMOLED is formed, consider now a device that is configured with embodiments described above.

In Operation

FIG. 7 illustrates an example computing device, generally at 700, that includes a display 702 that is implemented using an array of pixel circuits such as that described in FIG. 2, and an array of fingerprint sensors such as those described above. In this example, computing device 700, in the left most illustration, is not being actively used and is in a locked state. Assume now, that a user picks up the device and wishes to unlock it. They may do so by touching display 702 in any area. Computing device 700 includes a touch sensor that detects when the user touches the display. Upon sensing the touch input, the touch sensor can cause the display to turn on with any suitable type of light, such as white light or another color, to maximize the reflection from the user's finger, as shown in the right most illustration. When this occurs, the fingerprint sensors can detect the light reflected from the finger. This reflected light can then be processed to obtain a fingerprint which can then be used to either unlock the device in the event of a match, or leave the device locked in the event of no match. In some embodiments, the fingerprint is obtained by the charge detection circuitry 512 (FIG. 5) first reading the charge accumulated on each capacitor in the PIN diode circuits. These values can then be mapped, by a suitably-configured application, to grayscale images from which the fingerprints or fingerprint profiles can be obtained.

Figure 8:
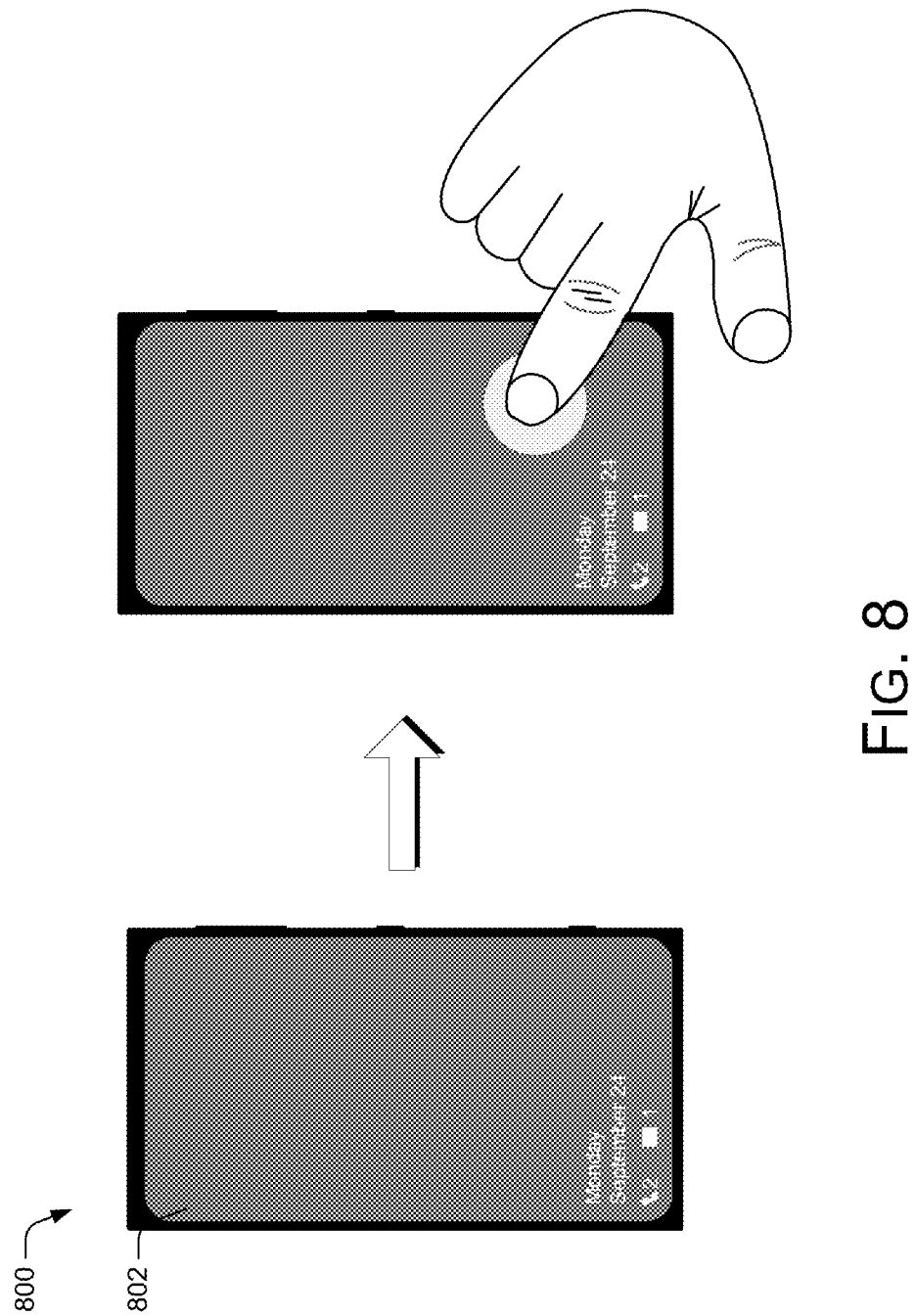
FIG. 8 illustrates an example computing device in accordance with one or more embodiments.

As another example, consider FIG. 8 which illustrates an example computing device, generally at 800, that includes a display 802 that is implemented using an array of pixel circuits such as that described in FIG. 2, and an array of fingerprint sensors such as those described above. In this example, computing device 800, in the left most illustration, is not being actively used and is in a locked state. Assume now, that a user picks up the device and wishes to unlock it. They may do so by touching display 802 in any area. Computing device 800 includes a touch sensor that detects when the user touches the display. Upon sensing the touch input, the touch sensor can cause the display to turn on in a localized area associated with the touch (indicated by the dashed circle) using any suitable type of light, such as white light or another color, to maximize the reflection from the user's finger, as shown in the right most illustration. When this occurs, the fingerprint sensors in the localized region can detect the light reflected from the finger. This reflected light can then be processed to obtain a fingerprint which can then be used to either unlock the device in the event of a match, or leave the device locked in the event of no match. In some embodiments, the fingerprint is first obtained by the charge detection circuitry 512 (FIG. 5) reading the charge accumulated on each capacitor in the PIN diode circuits. These values can then be mapped, by a suitably configured application, to grayscale images from which the fingerprints or fingerprint profiles can be obtained.

Figure 9:
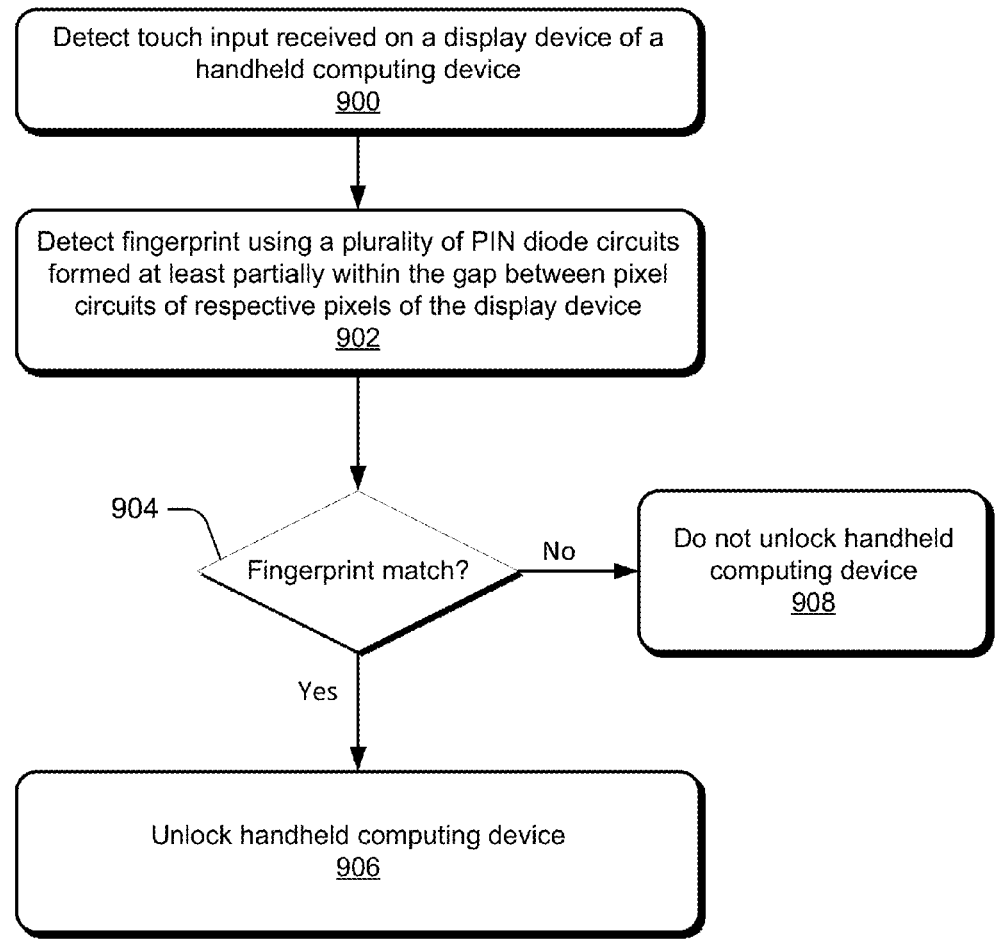
FIG. 9 is a flow diagram that describes steps in a method in accordance with one or more embodiments.

FIG. 9 is a flow diagram that describes steps in a method in accordance with one or more embodiments. The method can be implemented in connection with any suitable hardware, software, firmware, or combination thereof. In at least some embodiments, the method is implemented by a suitably configured handheld computing device, such as a cellular phone, examples of which are provided above and below.

Step 900 detects touch input received on a display device of a handheld computing device. This step can be performed by using a suitably configured touch sensor on the device. In some embodiments, the touch input can be detected anywhere on the display device. In other embodiments, a predefined area of the display device may be designated as a fingerprint area, e.g., the bottom half of the display device, the bottom right corner of the display device, and the like. Step 902 detects a fingerprint using a plurality of PIN diode circuits formed at least partially within the gap between pixel circuits of respective pixels of the display device. In at least some embodiments, this step can be performed by illuminating all or a majority of the pixels of display device to maximize the reflection of light from the touch input. In at least some other embodiments, this step can be performed by illuminating a plurality of pixels in a localized region or area where the touch input occurs. The number of pixels illuminated in the localized region will, in most if not all cases, be less in number than half, a quarter, or even an eighth of the total number of pixels that comprise the display device.

Step 904 ascertains whether a detected fingerprint matches a fingerprint or fingerprint profile stored on the computing device. If the detected fingerprint matches the stored fingerprint, step 906 unlocks the handheld computing device. If, on the other hand, the detected fingerprint does not match the stored fingerprint, step 908 does not unlock the handheld computing device.

Implementation Details

In some embodiments, the above-described functionality can be implemented in a one-chip configuration. This one-chip configuration would include a read-out integrated circuit as well as display driver integrated circuit. In other embodiments, the above-described functionality can be implemented in a two-chip configuration in which the fingerprint sensors reside on one chip while the sensing integrated circuit (referred to above as the charge detection circuitry 512) would reside on a second chip with an operable connection between the two by way of a flex material. Maintaining the read-out integrated circuit and the display driver integrated circuit on different chips would facilitate the operation of both, due to the higher breakdown voltage of the display driver, as opposed to the low noise amplification parameters associated with the read-out integrated circuit.

Purging the Storage Capacitors

During the course of operation, some leakage current from the PIN diodes may cause the associated capacitors to undesirably acquire a small charge. In these instances, the sensing circuitry, i.e., scan-enable circuitry 510 (FIG. 5) can purge the storage capacitors by removing the pre-charge electrons. This can improve sensor accuracy when the fingerprint scanner is operational.

Using a Multiplexer

In some embodiments, the fingerprint sensor can incorporate a multiplexer (MUX). In the case of light sensing, a higher refresh rate, such as 60 Hz, is not needed. Rather, much lower refresh rates can be utilized such as 1 Hz, 2 Hz, 3 Hz and so on. This can permit the use of large MUXs, such as a 50:1 MUX where 1 line can share 50 pixels. Thus, with the MUX, multiple sensor lines can be connected into one line and operation can be distributed based on timing. So, for example, with a 50:1 MUX, the first sensor line can be scanned using 0-0.02 second timing, the second sensor line can be scanned using 0.02-0.04 timing and so on.

Example Computing Device

Figure 10:
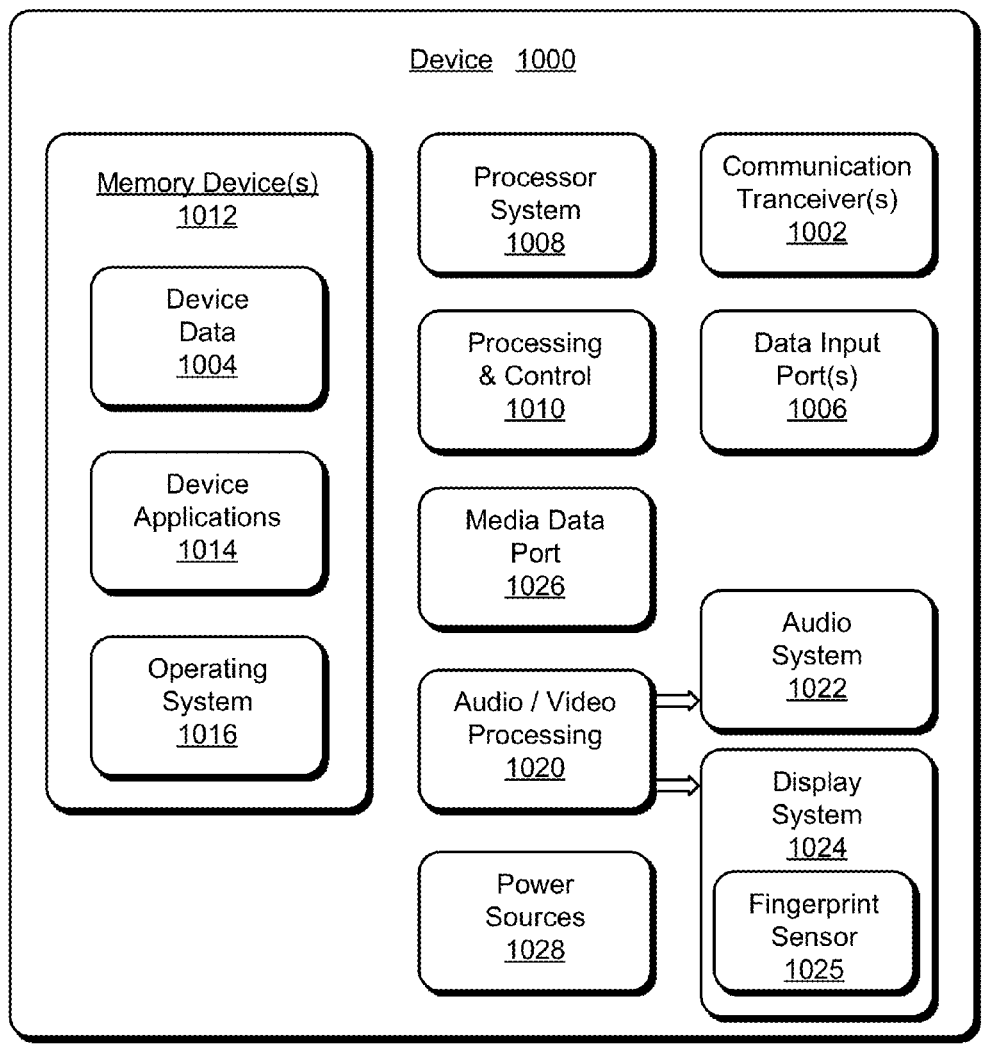
FIG. 10 illustrates a computing device in accordance with one or more embodiments.

FIG. 10 illustrates various components of an example device 1000 in which embodiments of the fingerprint sensor described above can be implemented. The example device 1000 can be implemented as a handheld device, such as any type of client device, mobile phone, tablet device, entertainment device, gaming device, media playback device, and/or other type of device. For example, the device of FIGS. 7 and 8 may be implemented as the example device 1000.

The device 1000 includes communication transceivers 1002 that enable wired and/or wireless communication of device data 1004 with other devices. Additionally, the device data can include any type of audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, and wired local area network (LAN) Ethernet transceivers for network data communication.

The device 1000 may also include one or more data input ports 1006 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 1000 includes a processing system 1008 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 1010. The device 1000 may further include any type of a system bus or other data and command transfer system that couples the various components within the device. A system bus can include any one or combination of different bus structures and architectures, as well as control and data lines.

The device 1000 also includes computer-readable storage memory 1012 that enable data storage, such as data storage devices that can be accessed by a computing device, and that provide persistent storage of data and executable instructions (e.g., software applications, programs, functions, and the like). Examples of the computer-readable storage memory 1012 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 1000 may also include a mass storage media device.

The computer-readable storage memory 1012 provides data storage mechanisms to store the device data 1004, other types of information and/or data, and various device applications 1014 (e.g., software applications). For example, an operating system 1016 can be maintained as software instructions with a memory device and executed by the processing system 1008. The device applications may also include a device manager, such as any form of a control application, software application, signal-processing and control module, code that is native to a particular device, a hardware abstraction layer for a particular device, and so on. The device applications can also include an application that performs authentication based on a fingerprint sensed by a fingerprint sensor as described above and below.

The device 1000 also includes an audio and/or video processing system 1020 that generates audio data for an audio system 1022 and/or generates display data for a display system 1024. The display system 1024 includes a fingerprint sensor 1025 as described above. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1026. In implementations, the audio system and/or the display system are integrated components of the example device. Alternatively, the audio system and/or the display system are external, peripheral components to the example device.

The device 1000 can also include one or more power sources 1028, such as when the device is implemented as a mobile device. The power sources may include a charging and/or power system, and can be implemented as a flexible strip battery, a rechargeable battery, a charged super-capacitor, and/or any other type of active or passive power source.

Although embodiments of fingerprint sensor embedded active matrix organic light emitting diode (AMOLED) displays have been described in language specific to features and/or methods, the subject of the appended claims is not necessarily limited to the specific features or methods described. Rather, the specific features and methods are disclosed as example implementations of fingerprint sensor embedded active matrix organic light emitting diode (AMOLED) displays, and other equivalent features and methods are intended to be within the scope of the appended claims. Further, various different embodiments are described and it is to be appreciated that each described embodiment can be implemented independently or in connection with one or more other described embodiments.

The invention claimed is:

1. A display for a handheld computing device, the display comprising:
   a substrate;
   an array of pixels formed on the substrate, the individual pixels including a corresponding pixel circuit, each pixel circuit including an active matrix organic light emitting diode (AMOLED), wherein individual pixels are separated from other pixels by a gap; and
   a fingerprint sensor formed on the substrate, the fingerprint sensor including a plurality of PIN diode circuits individual ones of which formed at least partially within respective individual gaps that separate individual pixels, wherein each PIN diode circuit is associated with multiple pixels.

2. The display as recited in claim 1, wherein the PIN diode circuits lie entirely within the associated gaps that separate individual pixels.

3. The display as recited in claim 1, wherein the PIN diode circuits include a PIN diode implemented as an active matrix organic light emitting diode (AMOLED).

4. The display as recited in claim 1, wherein the array of pixels include a plurality of four-pixel cells, individual four-pixel cells having an associated fingerprint sensor with an individual PIN diode circuit.

5. The display as recited in claim 1, wherein each PIN diode circuit comprises a light sensing block including a PIN diode and a capacitor connected across the PIN diode, and a switching transistor connected to the light sensing block.

6. The display as recited in claim 1, wherein the PIN diode circuits include a PIN diode implemented as an active matrix organic light emitting diode (AMOLED) at least a portion of which comprises amorphous silicon.

7. The display as recited in claim 1, wherein individual pixels are configured to illuminate responsive to a touch input on the display.

8. The display as recited in claim 1, wherein individual pixels are configured to illuminate in a localized area responsive to a touch input on the display.

9. A handheld computing device comprising:
   a processing system;
   one or more memory devices;
   an application stored on the one or more memory devices and executable by the processing system, the application being configured to perform fingerprint-based authentication;
   a display comprising:
      a substrate;
      an array of pixels formed on the substrate, the individual pixels including a corresponding pixel circuit, each pixel circuit including an active matrix organic light emitting diode (AMOLED), wherein individual pixels are separated from other pixels by a gap; and
      a fingerprint sensor formed on the substrate, the fingerprint sensor including a plurality of PIN diode circuits individual ones of which formed at least partially within respective individual gaps that separate individual pixels, wherein each PIN diode circuit is associated with multiple pixels
   wherein the application is configured to perform said fingerprint-based authentication based on a fingerprint sensed by the fingerprint sensor.

10. The handheld computing device as recited in claim 9, wherein the PIN diode circuits lie entirely within the associated gaps that separate individual pixels.

11. The handheld computing device as recited in claim 9, wherein the PIN diode circuits include a PIN diode implemented as an active matrix organic light emitting diode (AMOLED).

12. The handheld computing device as recited in claim 9, wherein each PIN diode circuit comprises a light sensing block including a PIN diode and a capacitor connected across the PIN diode, and a switching transistor connected to the light sensing block.

13. The handheld computing device as recited in claim 9, wherein the PIN diode circuits include a PIN diode implemented as an active matrix organic light emitting diode (AMOLED) at least a portion of which comprises amorphous silicon.

14. A method for detecting a fingerprint, the method comprising:
   detecting, by a handheld computing device, a touch input on a display device of the handheld computing device;
   detecting a fingerprint associated with the touch input using a plurality of PIN diode circuits formed at least partially within respective gaps between respective pixel circuits of the display device, each PIN diode circuit being associated with multiple pixel circuits;
   ascertaining whether a detected fingerprint matches a fingerprint profile stored on the handheld computing device; and
   responsive to the detected fingerprint matching the fingerprint profile, unlocking the handheld computing device.

15. The method as recited in claim 14, wherein said detecting comprises illuminating at least a majority of the pixels.

16. The method as recited in claim 14, wherein said detecting comprises illuminating a plurality of pixels in a localized region where the touch input occurs.

17. The method as recited in claim 14, wherein the PIN diode circuits lie entirely within the associated gaps.

18. The method as recited in claim 14, wherein the PIN diode circuits include a PIN diode implemented as an active matrix organic light emitting diode (AMOLED).

19. The method as recited in claim 14, wherein each PIN diode circuit comprises a light sensing block including a PIN diode and a capacitor connected across the PIN diode, and a switching transistor connected to the light sensing block.

20. The method as recited in claim 14, wherein the PIN diode circuits include a PIN diode implemented as an active matrix organic light emitting diode (AMOLED) at least a portion of which comprises amorphous silicon.

* * * * *